(12) United States Patent
Davies et al.

(10) Patent No.: US 12,454,966 B2
(45) Date of Patent: Oct. 28, 2025

(54) HYDRAULIC ROTARY GEARLESS ACTUATOR

(71) Applicant: Goodrich Actuation Systems Limited, Solihull (GB)

(72) Inventors: Stephen Harlow Davies, Shrewsbury (GB); Piotr Józef Zając, Wroclaw (PL); Paweł Gajecki, Cracow (PL)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 18/471,857

(22) Filed: Sep. 21, 2023

(65) Prior Publication Data

US 2025/0035134 A1 Jan. 30, 2025

Related U.S. Application Data

(60) Provisional application No. 63/516,043, filed on Jul. 27, 2023.

(51) Int. Cl.
*F15B 15/06* (2006.01)
*F16H 25/18* (2006.01)

(52) U.S. Cl.
CPC ............ *F15B 15/06* (2013.01); *F16H 25/186* (2013.01)

(58) Field of Classification Search
CPC ....................................................... F15B 15/06
See application file for complete search history.

(56) References Cited

U.S. PATENT DOCUMENTS

| 3,391,722 | A | | 7/1968 | Ligh |
| 5,848,554 | A | * | 12/1998 | Kober ...................... B60S 9/08 |
| | | | | 254/102 |
| 7,802,488 | B2 | * | 9/2010 | Bucheton .............. F16H 25/205 |
| | | | | 74/89.26 |
| 8,172,174 | B2 | | 5/2012 | Hejda |
| 8,266,976 | B2 | | 9/2012 | Waide |
| 8,573,080 | B2 | | 11/2013 | Quenerch'du et al. |
| 8,844,389 | B2 | | 9/2014 | Kopecek |
| 8,979,019 | B2 | | 3/2015 | Christensen et al. |

(Continued)

FOREIGN PATENT DOCUMENTS

| EP | 0161919 A2 | 11/1985 |
| EP | 0365377 A1 | 4/1990 |

OTHER PUBLICATIONS

European Search Report for Application No. 24190412.7, mailed Dec. 13, 2024, 8 pages.

*Primary Examiner* — William C Joyce
(74) *Attorney, Agent, or Firm* — CANTOR COLBURN LLP

(57) ABSTRACT

A hydraulic rotary gearless actuator includes an input stage and an output stage. The input stage includes a piston linearly translatable within an input cylinder. The output stage includes first and second output cylinders defining first and second tracks, respectively, and a trunnion assembly connected to the piston and including first and second rollers engageable with the first and second tracks, respectively. The output stage is configured to convert linear translation of the piston into rotation of the first output cylinder relative to the second output cylinder by the trunnion assembly being driven linearly by the linear translation of the piston and the first and second rollers engaging with the first and second tracks, respectively.

20 Claims, 3 Drawing Sheets

(56) References Cited

U.S. PATENT DOCUMENTS

| | | | |
|---|---|---|---|
| 10,040,539 B2* | 8/2018 | Antunes | F16H 25/2472 |
| 10,662,897 B2 | 5/2020 | Kopecek et al. | |
| 10,737,764 B2 | 8/2020 | Fox et al. | |
| 10,822,074 B2 | 11/2020 | Edwards et al. | |
| 11,460,082 B2 | 10/2022 | Al-Mahshi et al. | |
| 2011/0042511 A1* | 2/2011 | Elliott | B64C 25/20 |
| | | | 244/102 R |
| 2011/0048147 A1* | 3/2011 | Keech | F16H 25/205 |
| | | | 74/89.26 |
| 2016/0280356 A1* | 9/2016 | Medina | F16H 25/205 |
| 2021/0146535 A1 | 5/2021 | Naderer et al. | |

\* cited by examiner

HYDRAULIC ROTARY GEARLESS ACTUATOR

CROSS-REFERENCE TO RELATED APPLICATIONS

This application claims the benefit of U.S. Provisional Application No. 63/516,043 filed Jul. 27, 2023, the disclosure of which is incorporated herein by reference in its entirety.

BACKGROUND

The present disclosure relates to actuators and, in particular, to a hydraulic rotary gearless actuator.

An experimental airliner is currently under development and uses extra-long, thin wings that are stabilized by diagonal struts. This configuration is generally referred to a transonic truss-braced wing concept. The aircraft configuration is based on research studies referred to as "Subsonic Ultra-Green Aircraft Reach (SUGAR)" which extensively studied truss-bracing and hybrid electric technologies.

SUMMARY

According to an aspect of the disclosure, a hydraulic rotary gearless actuator is provided. The hydraulic gearless actuator includes an input stage and an output stage. The input stage includes a piston linearly translatable within an input cylinder. The output stage includes first and second output cylinders defining first and second tracks, respectively, and a trunnion assembly connected to the piston and including first and second rollers engageable with the first and second tracks, respectively. The output stage is configured to convert linear translation of the piston into rotation of the first output cylinder relative to the second output cylinder by the trunnion assembly being driven linearly by the linear translation of the piston and the first and second rollers engaging with the first and second tracks, respectively.

In accordance with additional or alternative embodiments, hydraulics are provided to hydraulically drive the linear translation of the piston.

In accordance with additional or alternative embodiments, a rotary variable differential transformer calculates an angular displacement of the first output cylinder.

In accordance with additional or alternative embodiments, the first output cylinder is a rotary cylinder and the first tracks are helical tracks, the second output cylinder is a static cylinder, which is static relative to the input cylinder, and the second tracks are axial tracks and the hydraulic rotary gearless actuator further includes bearings interposed between the first and second output cylinders.

In accordance with additional or alternative embodiments, the first output cylinder and the helical tracks are disposed about the second output cylinder and the axial tracks.

In accordance with additional or alternative embodiments, the trunnion assembly includes a central hub and multiple trunnions extending radially outwardly from the central hub and each of the trunnions includes one of the first rollers and one of the second rollers.

In accordance with additional or alternative embodiments, the one of the first rollers is outboard of the one of the second rollers.

According to an aspect of the disclosure, a hydraulic rotary gearless actuator is provided and includes an input stage and an output stage. The input stage includes an input cylinder and a piston linearly translatable within the input cylinder. The output stage includes a first output cylinder defining first tracks, a second output cylinder defining second tracks and a trunnion assembly connected to the piston. The trunnion assembly includes first rollers disposed to engage with the first tracks and second rollers disposed to engage with the second tracks. The output stage is configured to convert linear translation of the piston into rotary movement of the first output cylinder relative to the second output cylinder by the trunnion assembly being driven linearly by the linear translation of the piston and the first and second rollers engaging with the first and second tracks, respectively.

In accordance with additional or alternative embodiments, hydraulics are provided to hydraulically drive the linear translation of the piston.

In accordance with additional or alternative embodiments, a rotary variable differential transformer calculates an angular displacement of the first output cylinder.

In accordance with additional or alternative embodiments, the first output cylinder is a rotary cylinder and the first tracks are helical tracks, the second output cylinder is a static cylinder, which is static relative to the input cylinder, and the second tracks are axial tracks and the hydraulic rotary gearless actuator further includes bearings interposed between the first and second output cylinders.

In accordance with additional or alternative embodiments, the first output cylinder and the helical tracks are disposed about the second output cylinder and the axial tracks.

In accordance with additional or alternative embodiments, the trunnion assembly includes a central hub and multiple trunnions extending radially outwardly from the central hub and each of the trunnions includes one of the first rollers and one of the second rollers.

In accordance with additional or alternative embodiments, the one of the first rollers is outboard of the one of the second rollers.

According to an aspect of the disclosure, a hydraulic rotary gearless actuator is provided and includes a hydraulic input stage and a mechanical output stage. The hydraulic input stage includes an input cylinder and a piston, which is hydraulically drivable to linearly translate within the input cylinder. The mechanical output stage includes a first output cylinder defining first tracks, a second output cylinder defining second tracks and a trunnion assembly connected to the piston. The trunnion assembly includes first rollers disposed to engage with the first tracks and second rollers disposed to engage with the second tracks. The mechanical output stage is configured to convert linear translation of the piston into rotary movement of the first output cylinder relative to the second output cylinder by the trunnion assembly being driven linearly by the linear translation of the piston and the first and second rollers engaging with the first and second tracks, respectively.

In accordance with additional or alternative embodiments, hydraulics are provided to hydraulically drive the linear translation of the piston.

In accordance with additional or alternative embodiments, a rotary variable differential transformer calculates an angular displacement of the first output cylinder.

In accordance with additional or alternative embodiments, the first output cylinder is a rotary cylinder and the first tracks are helical tracks, the second output cylinder is a static cylinder, which is static relative to the input cylinder, and the second tracks are axial tracks and the hydraulic rotary gearless actuator further includes bearings interposed between the first and second output cylinders.

In accordance with additional or alternative embodiments, the trunnion assembly includes a central hub and multiple trunnions extending radially outwardly from the central hub and each of the trunnions comprises one of the first rollers and one of the second rollers.

In accordance with additional or alternative embodiments, the first output cylinder is disposed about the second output cylinder and, for each of the trunnions, the one of the first rollers is outboard of the one of the second rollers.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Aircraft manufacturers are currently pursuing new, thin wing concepts as part of a pursuit of carbon neutral airplanes. Recent technology reviews have identified a need for small (~3-4" diameter) hydraulically powered rotary actuators to this end. Presently, industry solutions are limited to rotary vane actuators which are difficult to seal.

Thus, as will be described below, a mechanical output stage of a gearless rotary actuator is combined with a new hydraulic input stage. The mechanical output stage converts a linear translation of the input stage into rotary movement via a trunnion assembly system that utilizes rolling track rollers in set of grooves. Unlike cases in which the linear translation of input is provided by a motor driven ball-screw, the linear translation as described herein is provided directly via a hydraulic piston in a cylinder. The approach enables a magnitude increase in developed axial force generated by the input stage which enables a new level of output torque from the machine.

Figure 1A:
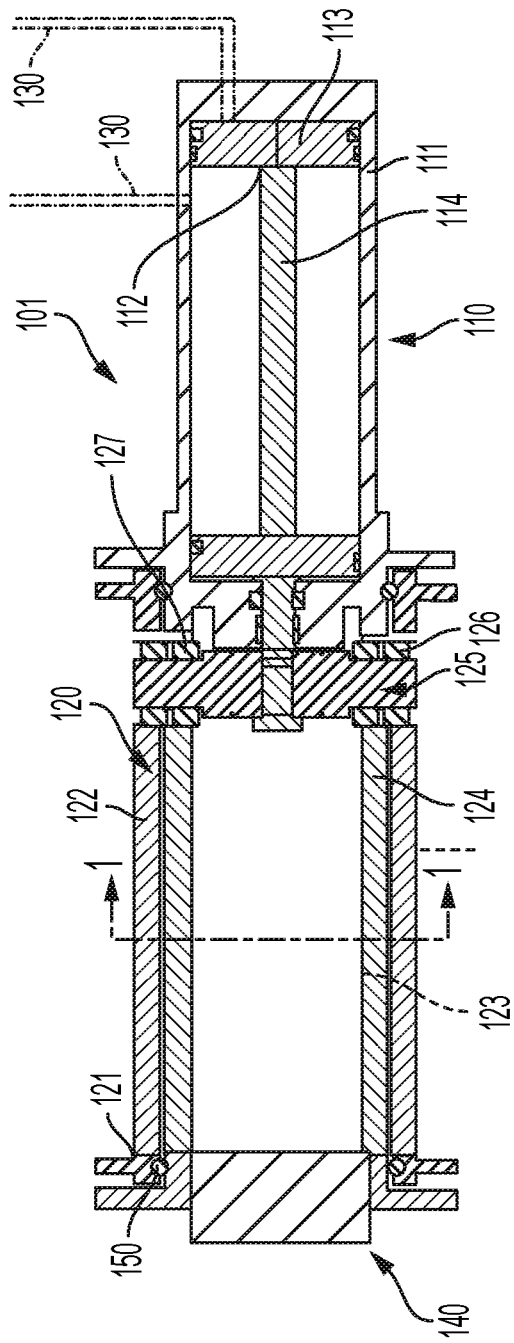
FIG. 1A is a side view of a hydraulic rotary gearless actuator in accordance with embodiments.
Figure 1B:
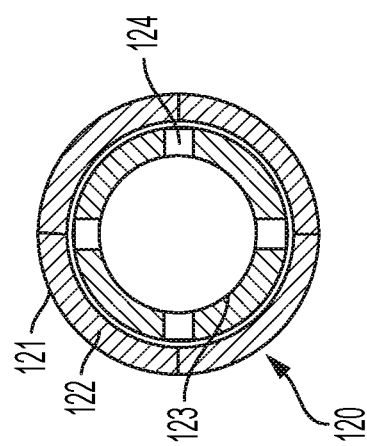
FIG. 1B is an axial view of a mechanical output stage of the hydraulic rotary gearless actuator of FIG. 1A taken along line 1-1 in accordance with embodiments.

With reference to FIGS. 1A and 1B, a hydraulic rotary gearless actuator 101 is provided and includes a hydraulic input stage 110, a mechanical output stage 120, hydraulics 130 and a rotary variable differential transformer (RVDT) 140. The hydraulic input stage 110 includes an input cylinder 111 and a piston 112 that is linearly translatable within the input cylinder 111. The piston 112 includes a head 113 that is sealed and movable within an interior diameter of the input cylinder 111 and a shaft 114 that is movable with the head 113. The mechanical output stage 120 includes a first output cylinder 121, which is formed to define first tracks 122 (i.e., helical tracks; for purposes of clarity and brevity, the following description will relate to the case of the first tracks 122 being helical tracks), a second output cylinder 123, which is formed to define second tracks 124 (i.e., axial tracks; for purposes of clarity and brevity, the following description will relate to the case of the second tracks 124 being axial tracks) and a trunnion assembly 125 that is connected to the shaft 114 of the piston 112. The trunnion assembly 125 includes first rollers 126 and second rollers 127. The first rollers 126 are respectively disposed to engage with corresponding ones of the first tracks 122. The second rollers 127 are respectively disposed to engage with corresponding ones of the second tracks 124.

The hydraulics 130 are disposed and configured to hydraulically drive the linear translation of the piston 112 and may include multiple hydraulic lines on either side of the head 113 of the piston 112 to pressurize and depressurize an interior of the input cylinder 111 on the sides of the head 113. The RVDT 140 is disposed and configured within an RVDT zone 141 of the second output cylinder 123 to calculate an angular displacement of the first output cylinder 121 (i.e., the angular displacement generated by the gearless actuator).

The mechanical output stage 120 is configured to convert linear translation of the piston 112 into rotary movement of the first output cylinder 121 relative to the second output cylinder 123 by the action of the trunnion assembly 125 being driven linearly by the linear translation of the shaft 114 of the piston 112 and by the actions of the first and second rollers 126 and 127 engaging with the first and second tracks 122 and 124, respectively.

In accordance with embodiments, the first output cylinder 121 is a rotary cylinder and the first tracks 122 are the helical tracks, the second output cylinder 123 is a static cylinder, which is static relative to the input cylinder 111, and the second tracks 124 are the axial tracks and the hydraulic rotary gearless actuator 101 further includes bearings 150, such as axial bearings, interposed between the first output cylinder 121 and the second output cylinder 123. The first output cylinder 121 and the first tracks 122 can be, but are not required to be, disposed about the second output cylinder 123 and the second tracks 124.

Figure 2:
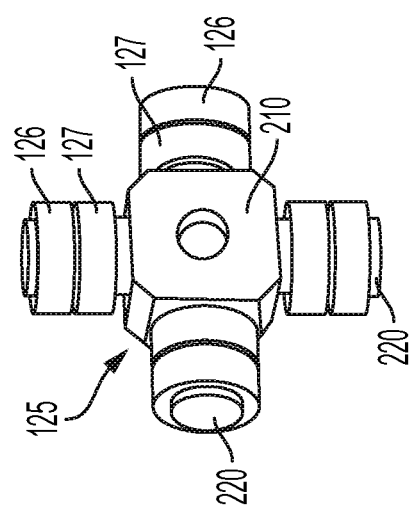
FIG. 2 is a perspective view of a trunnion assembly of the hydraulic rotary gearless actuator of FIG. 1 in accordance with embodiments.

With reference to FIG. 2 and in accordance with embodiments, the trunnion assembly 125 includes a central hub 210 and multiple trunnions 220 extending radially outwardly from the central hub 210. Each of the trunnions 220 can include one or more of the first rollers 126 and one or more of the second rollers 127, with the one or more of the first rollers 126 being outboard of the one or more of the second rollers 127 (to correspond to the first tracks 122 being outboard of the second tracks 124). The trunnion assembly 125 can include four trunnions 220 at uniform angular displacements in an exemplary case. Each of the one or more of the first rollers 126 and each of the one or more of the second rollers 127 can be provided as a bushing or a journal bearing.

In an operation of the hydraulic rotary gearless actuator 101 of FIGS. 1A and 1B and the trunnion assembly 125 of FIGS. 1A and 2, as the piston 112 translates linearly within the input cylinder 111, the shaft 114 drives a corresponding linear translation of the trunnion assembly 125. During this linear translation of the trunnion assembly 125, the engagement of the second rollers 127 with the second tracks 124 maintains an angular position of the trunnion assembly 125 whereas the engagement of the first rollers 126 with the first tracks 122 generates rotational torque. This rotational torque can only be dissipated by rotation of the first output cylinder 121 relative to the second output cylinder 123.

Figure 3A:
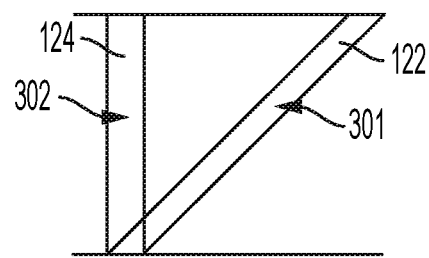
FIGS. 3A-3D are schematic illustrations of first and second track pairs of the mechanical output stage of FIGS. 1A and 1B in accordance with embodiments.
Figure 3B:
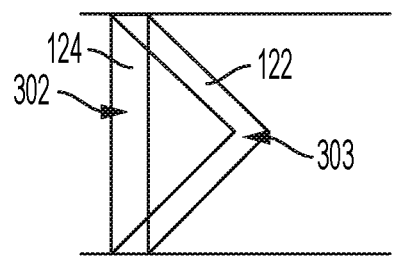
Figure 3C:
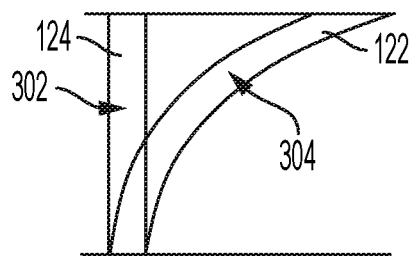
Figure 3D:
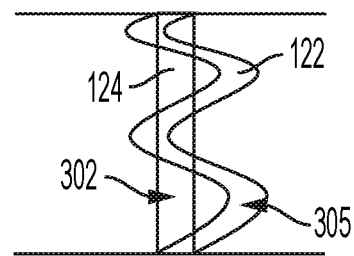

With reference to FIGS. 3A-3D, various embodiments of corresponding pairs of the first and second tracks 122 and 124 are illustrated and capable of producing various types, patterns and power profiles of output for the mechanical output stage 120. As shown in FIG. 3A, the case in which the first track 122 is a helical track 301 and the second track is an axial track 302 is shown. As shown in FIG. 3B, the case in which the first track 122 is a two-stroke helical track 303 and the second track is an axial track 302 is shown. As shown in FIG. 3C, the case in which the first track 122 is a non-linear helical track 304 and the second track is an axial track 302 is shown. As shown in FIG. 3D, the case in which the first track 122 is a sinusoidal track 305 and the second track is an axial track 302 is shown.

Technical effects and benefits of the present disclosure are the provision of a hydraulic rotary gearless actuator. Typically, for the given envelope of 3.4" diameter, an electrically actuated gearless actuator would be limited to an output torque window of up to 750 Nm. With the features described herein. an output torque of 4000 Nm is achievable and makes it possible to compete with competitor rotary vane actuators for new applications.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A hydraulic rotary gearless actuator, comprising:
    an input stage comprising a piston linearly translatable within an input cylinder; and
    an output stage comprising:
    a first output cylinder defining first tracks;
    second output cylinder defining second tracks; and
    a trunnion assembly connected to the piston and comprising first and second rollers engageable with the first tracks and with the second tracks, respectively,
    the output stage being configured to convert linear translation of the piston into rotation of the first output cylinder relative to the second output cylinder by the trunnion assembly being driven linearly by the linear translation of the piston and the first and second rollers engaging with the first tracks and with the second tracks, respectively,
    wherein:
    each of the first tracks is a two-stroke helical track and each of the second tracks is an axial track with first and second ends opposing one another, and
    each of the two-stroke helical tracks begins and terminates at the first and second ends of a corresponding one of the second tracks and comprises:
    a first track section, which is straight and angled away from the first end of the corresponding one of the second tracks such that, when the first and second rollers engage with the first track section and the second track, respectively, due to the linear translation of the piston in one direction, the first output cylinder rotates in a first direction relative to the second output cylinder;
    a second track section, which is straight and angled toward the second end of the corresponding one of the second tracks such that, when the first and second rollers engage with the second track section and the second track, respectively, due to the linear translation of the piston in the one direction, the first output cylinder rotates in a second direction opposite the first direction relative to the second output cylinder; and
    an angular section at which the first and second track sections intersect.

2. The hydraulic rotary gearless actuator according to claim 1, further comprising hydraulics to hydraulically drive the linear translation of the piston.

3. The hydraulic rotary gearless actuator according to claim 1, further comprising a rotary variable differential transformer to calculate an angular displacement of the first output cylinder.

4. The hydraulic rotary gearless actuator according to claim 1, wherein:
    the first output cylinder is a rotary cylinder,
    the second output cylinder is a static cylinder, which is static relative to the input cylinder, and
    the hydraulic rotary gearless actuator further comprises bearings interposed between the first and second output cylinders.

5. The hydraulic rotary gearless actuator according to claim 4, wherein the first output cylinder and the two-stroke helical tracks are disposed about the second output cylinder and the axial tracks.

6. The hydraulic rotary gearless actuator according to claim 1, wherein:
    the trunnion assembly comprises a central hub and multiple trunnions extending radially outwardly from the central hub, and
    each of the trunnions comprises one of the first rollers and one of the second rollers.

7. The hydraulic rotary gearless actuator according to claim 6, wherein the one of the first rollers is outboard of the one of the second rollers.

8. A hydraulic rotary gearless actuator, comprising:
    an input stage comprising an input cylinder and a piston linearly translatable within the input cylinder; and
    an output stage comprising:
    a first output cylinder defining first tracks;
    a second output cylinder defining second tracks; and
    a trunnion assembly connected to the piston and comprising:
    first rollers disposed to engage with the first tracks; and
    second rollers disposed to engage with the second tracks,
    the output stage being configured to convert linear translation of the piston into rotary movement of the first output cylinder relative to the second output cylinder by the trunnion assembly being driven linearly by the linear translation of the piston and the first and second rollers engaging with the first and second tracks, respectively, wherein:
each of the first tracks is a two-stroke helical track and each of the second tracks is an axial track with first and second ends opposing one another, and each of the two-stroke helical tracks begins and terminates at the first and second ends of a corresponding one of the second tracks and comprises:

a first track section, which is straight and angled away from the first end of the corresponding one of the second tracks such that, when the first and second rollers engage with the first track section and the second track, respectively, due to the linear translation of the piston in one direction, the first output cylinder rotates in a first direction relative to the second output cylinder;

a second track section, which is straight and angled toward the second end of the corresponding one of the second tracks such that, when the first and second rollers engage with the second track section and the second track, respectively, due to the linear translation of the piston in the one direction, the first output cylinder rotates in a second direction opposite the first direction relative to the second output cylinder; and an angular section at which the first and second track sections intersect.

9. The hydraulic rotary gearless actuator according to claim 8, further comprising hydraulics to hydraulically drive the linear translation of the piston.

10. The hydraulic rotary gearless actuator according to claim 8, further comprising a rotary variable differential transformer to calculate an angular displacement of the first output cylinder.

11. The hydraulic rotary gearless actuator according to claim 8, wherein:
the first output cylinder is a rotary cylinder,
the second output cylinder is a static cylinder, which is static relative to the input cylinder, and
the hydraulic rotary gearless actuator further comprises bearings interposed between the first and second output cylinders.

12. The hydraulic rotary gearless actuator according to claim 11, wherein the first output cylinder and the two-stroke helical tracks are disposed about the second output cylinder and the axial tracks.

13. The hydraulic rotary gearless actuator according to claim 8, wherein:
the trunnion assembly comprises a central hub and multiple trunnions extending radially outwardly from the central hub, and
each of the trunnions comprises one of the first rollers and one of the second rollers.

14. The hydraulic rotary gearless actuator according to claim 13, wherein the one of the first rollers is outboard of the one of the second rollers.

15. A hydraulic rotary gearless actuator, comprising:
a hydraulic input stage comprising an input cylinder and a piston, which is hydraulically drivable to linearly translate within the input cylinder; and
a mechanical output stage comprising:
a first output cylinder defining first tracks;
a second output cylinder defining second tracks; and
a trunnion assembly connected to the piston and comprising:
first rollers disposed to engage with the first tracks; and
second rollers disposed to engage with the second tracks,
the mechanical output stage being configured to convert linear translation of the piston into rotary movement of the first output cylinder relative to the second output cylinder by the trunnion assembly being driven linearly by the linear translation of the piston and the first and second rollers engaging with the first and second tracks, respectively, wherein:
each of the first tracks is a two-stroke helical track and each of the second tracks is an axial track with first and second ends opposing one another, and
each of the two-stroke helical tracks begins and terminates at the first and second ends of a corresponding one of the second tracks and comprises:

a first track section, which is straight and angled away from the first end of the corresponding one of the second tracks such that, when the first and second rollers engage with the first track section and the second track, respectively, due to the linear translation of the piston in one direction, the first output cylinder rotates in a first direction relative to the second output cylinder;

a second track section, which is straight and angled toward the second end of the corresponding one of the second tracks such that, when the first and second rollers engage with the second track section and the second track, respectively, due to the linear translation of the piston in the one direction, the first output cylinder rotates in a second direction opposite the first direction relative to the second output cylinder; and an angular section at which the first and second track sections intersect.

16. The hydraulic rotary gearless actuator according to claim 15, further comprising hydraulics to hydraulically drive the linear translation of the piston.

17. The hydraulic rotary gearless actuator according to claim 15, further comprising a rotary variable differential transformer to calculate an angular displacement of the first output cylinder.

18. The hydraulic rotary gearless actuator according to claim 15, wherein:
the first output cylinder is a rotary cylinder,
the second output cylinder is a static cylinder, which is static relative to the input cylinder, and
the hydraulic rotary gearless actuator further comprises bearings interposed between the first and second output cylinders.

19. The hydraulic rotary gearless actuator according to claim 18, wherein:
the trunnion assembly comprises a central hub and multiple trunnions extending radially outwardly from the central hub, and
each of the trunnions comprises one of the first rollers and one of the second rollers.

20. The hydraulic rotary gearless actuator according to claim 19, wherein the first output cylinder is disposed about the second output cylinder and, for each of the trunnions, the one of the first rollers is outboard of the one of the second rollers.

* * * * *